United States Patent
Kelly et al.

(10) Patent No.: US 10,767,564 B2
(45) Date of Patent: Sep. 8, 2020

(54) AIR TURBINE STARTER WITH AUTOMATED VARIABLE INLET VANES

(71) Applicant: Hamilton Sundstrand Corporation, Charlotte, NC (US)

(72) Inventors: Myles R. Kelly, Willimantic, CT (US); James S. Elder, South Windsor, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 656 days.

(21) Appl. No.: 15/461,587

(22) Filed: Mar. 17, 2017

(65) Prior Publication Data
US 2018/0266328 A1   Sep. 20, 2018

(51) Int. Cl.
*F02C 7/277* (2006.01)
*F01D 25/34* (2006.01)
(Continued)

(52) U.S. Cl.
CPC ............... *F02C 7/277* (2013.01); *F01D 9/041* (2013.01); *F01D 17/06* (2013.01); *F01D 17/162* (2013.01);
(Continued)

(58) Field of Classification Search
CPC .......... F02C 7/275; F02C 7/277; F02C 7/268; F02C 9/22; F01D 17/162; F01D 17/06; F05D 2270/304
See application file for complete search history.

(56) References Cited

U.S. PATENT DOCUMENTS

| | | | | |
|---|---|---|---|---|
| 2,908,189 A | * | 10/1959 | Chapman | F02C 7/32 475/2 |
| 3,521,505 A | * | 7/1970 | Sebring | F02C 7/275 475/6 |

(Continued)

FOREIGN PATENT DOCUMENTS

| CN | 104533631 A | 4/2015 |
|---|---|---|
| DE | 10013335 A1 | 9/2001 |

(Continued)

OTHER PUBLICATIONS

Screen captures from YouTube video clip entitled "T58 pt. 4: Variable Stator System," 6 pages, uploaded on Jun. 9, 2012 by user "AgentJayZ". Retrieved from Internet: < https://www.youtube.com/watch?v=N-c3OPmR3tw >. (Year: 2012).*

(Continued)

*Primary Examiner* — Scott J Walthour
*Assistant Examiner* — Todd N Jordan
(74) *Attorney, Agent, or Firm* — Cantor Colburn LLP

(57) ABSTRACT

According to one embodiment, an air turbine starter is provided. The air turbine starter comprising: a turbine wheel including a hub integrally attached to a turbine rotor shaft and a plurality of turbine blades extending radially outward from the hub; an inlet housing at least partially surrounding the turbine wheel; a nozzle located upstream from the turbine wheel and contained within the inlet housing defining an inlet flowpath between the nozzle and the inlet housing, the inlet flowpath directs air flow into the turbine blades; and a plurality of turbine vanes rotatably connected to the nozzle, each turbine vane extending radially from the nozzle into the inlet flowpath towards the inlet housing; wherein the plurality of turbine vanes are operable to adjust air flow through the inlet flowpath by rotating each turbine vane.

6 Claims, 6 Drawing Sheets

(51) Int. Cl.
*F01D 17/16* (2006.01)
*F01D 9/04* (2006.01)
*F01D 17/06* (2006.01)
*F02C 7/32* (2006.01)

(52) U.S. Cl.
CPC ............... *F01D 25/34* (2013.01); *F02C 7/32* (2013.01); *F05D 2220/32* (2013.01); *F05D 2240/128* (2013.01); *F05D 2260/85* (2013.01); *F05D 2270/304* (2013.01); *Y02T 50/671* (2013.01)

(56) References Cited

U.S. PATENT DOCUMENTS

| | | | |
|---|---|---|---|
| 5,136,837 A | | 8/1992 | Davison |
| 8,651,806 B2 * | | 2/2014 | Zawilinski .............. F01D 25/24 415/182.1 |
| 2012/0042659 A1 | | 2/2012 | Zawilinski et al. |

FOREIGN PATENT DOCUMENTS

| | | | |
|---|---|---|---|
| GB | 479889 A | 2/1938 | |
| GB | 1228297 A | 4/1971 | |
| RU | 2123126 C1 | 12/1998 | |

OTHER PUBLICATIONS

Extended European Search Report for Application No. 18161599.8-1006; dated Aug. 7, 2018; Report Received Date: Aug. 14, 2018; 10 pages.

* cited by examiner

AIR TURBINE STARTER WITH AUTOMATED VARIABLE INLET VANES

BACKGROUND

The embodiments herein generally relate to an air-turbine starter used to start gas turbine engines and more specifically, the inlet guide vanes of an air turbine starter.

Many relatively large gas turbine engines, including turbofan engines, may use an air turbine starter (ATS) to initiate gas turbine engine rotation. The ATS is typically mounted on the accessory gearbox which, in turn, is mounted on the engine or airframe. Consequently, the ATS is installed in the aircraft at all times even though active operation may occur only for a minute or so at the beginning of each flight cycle, along with occasional operation during engine maintenance activities.

The ATS generally includes a turbine section coupled to an output section within a housing. The turbine section is coupled to a high pressure fluid source, such as compressed air, to drive the output section through a gear system. Thus, when the high pressure fluid source impinges upon the turbine section, the output section powers the gas turbine engine.

When the gas turbine engine of an airplane has been shut off for example, after the airplane has landed at an airport, the engine is hot and due to heat rise, the upper portions of the engine will be hotter than lower portions of the engine. When this occurs thermal expansion may cause deflection of components of the engine which can result in a "bowed rotor" condition. If a gas turbine engine is in such a bowed rotor condition, it is undesirable to restart or start the engine. One approach to mitigating a bowed rotor condition is to use the ATS to drive rotation (i.e., cool-down motoring) of a spool within the engine for an extended period of time at a selected speed and is referred to as bowed motor rotoring (BMR). Enhancements to improve the efficiency of BMR are greatly desired.

BRIEF DESCRIPTION

According to one embodiment, an air turbine starter is provided. The air turbine starter comprising: a turbine wheel including a hub integrally attached to a turbine rotor shaft and a plurality of turbine blades extending radially outward from the hub; an inlet housing at least partially surrounding the turbine wheel; a nozzle located upstream from the turbine wheel and contained within the inlet housing defining an inlet flowpath between the nozzle and the inlet housing, the inlet flowpath directs air flow into the turbine blades; and a plurality of turbine vanes rotatably connected to the nozzle, each turbine vane extending radially from the nozzle into the inlet flowpath towards the inlet housing; wherein the plurality of turbine vanes are operable to adjust air flow through the inlet flowpath by rotating each turbine vane.

In addition to one or more of the features described above, or as an alternative, further embodiments of the air turbine starter may include at least one actuator operably connected to at least one turbine vane, the at least one actuator in operation rotates at least one turbine vane.

In addition to one or more of the features described above, or as an alternative, further embodiments of the air turbine starter may include where the at least one actuator is at least one of a pneumatic actuator, an electric actuator, and a hydraulic actuator.

In addition to one or more of the features described above, or as an alternative, further embodiments of the air turbine starter may include: a sync-ring operably connected to each turbine vane, the sync-ring in operation rotates each turbine vane when the sync-ring moves; and at least one actuator operably connected to the sync-ring, the actuator in operation moves the sync-ring.

In addition to one or more of the features described above, or as an alternative, further embodiments of the air turbine starter may include where the plurality of turbine vanes are rotated in unison when the sync-ring moves.

In addition to one or more of the features described above, or as an alternative, further embodiments of the air turbine starter may include a controller in communication with the actuator, the configured operates the actuator in response to airflow requirements of the air turbine starter.

In addition to one or more of the features described above, or as an alternative, further embodiments of the air turbine starter may include a speed sensor in communication with the controller, the speed sensor in operation detects an angular velocity of the turbine rotor shaft.

In addition to one or more of the features described above, or as an alternative, further embodiments of the air turbine starter may include where the controller in operation determines the airflow requirements of the air turbine starter in response to the angular velocity of the turbine rotor shaft.

In addition to one or more of the features described above, or as an alternative, further embodiments of the air turbine starter may include where the speed sensor is located on the turbine rotor shaft.

In addition to one or more of the features described above, or as an alternative, further embodiments of the air turbine starter may include where the controller in operation determines the airflow requirements of the air turbine starter in response to at least one of an angular velocity of a gas turbine engine operably connected to the air turbine starter, an angular velocity of the turbine rotor shaft, and a pressure upstream of the air turbine starter.

According to another embodiment, a method of assembling an air turbine starter is provided. The method comprising: obtaining an inlet housing; inserting a turbine wheel into the inlet housing, such that the inlet housing at least partially surrounds the turbine wheel, the turbine wheel including a hub integrally attached to a turbine rotor shaft and a plurality of turbine blades extending radially outward from the hub; rotatably connecting a plurality of turbine vanes on to a nozzle, the plurality of extending radially outward from the nozzle; inserting the nozzle into the inlet housing and upstream from the turbine wheel, the inlet housing defining an inlet flowpath between the nozzle and the inlet housing, the inlet flowpath directs air flow into the turbine blades; and wherein the plurality of turbine vanes extend radially outward from the nozzle into the inlet flowpath towards the inlet housing and the plurality of turbine vanes are operable to adjust air flow through the inlet flowpath by rotating each turbine vane.

In addition to one or more of the features described above, or as an alternative, further embodiments of the method may include operably connecting at least one actuator to at least one turbine vane, the at least one actuator in operation rotates at least one turbine vane.

In addition to one or more of the features described above, or as an alternative, further embodiments of the method may include where the at least one actuator is at least one of a pneumatic actuator, an electric actuator, and a hydraulic actuator.

In addition to one or more of the features described above, or as an alternative, further embodiments of the method may include: operably connecting a sync-ring to each turbine vanes, the sync-ring in operation rotates each turbine vane when the sink rink moves; and operably connecting at least one actuator to the sync-ring, the actuator in operation moves the sync-ring.

In addition to one or more of the features described above, or as an alternative, further embodiments of the method may include where the plurality of turbine vanes are rotated in unison when the sync-ring moves.

In addition to one or more of the features described above, or as an alternative, further embodiments of the method may include electronically connecting a controller to the actuator, the controller operates the actuator in response to airflow requirements of the air turbine starter.

In addition to one or more of the features described above, or as an alternative, further embodiments of the method may include electronically connecting a speed sensor to the controller, the speed sensor in operation detects an angular velocity of the turbine rotor shaft.

In addition to one or more of the features described above, or as an alternative, further embodiments of the method may include where the controller in operation determines the airflow requirements of the air turbine starter in response to the angular velocity of the turbine rotor shaft.

In addition to one or more of the features described above, or as an alternative, further embodiments of the method may include where the speed sensor is located on the turbine rotor shaft.

In addition to one or more of the features described above, or as an alternative, further embodiments of the method may include where the controller in operation determines the airflow requirements of the air turbine starter in response to at least one of an angular velocity of a gas turbine engine operably connected to the air turbine starter, an angular velocity of the turbine rotor shaft, and a pressure upstream of the air turbine starter.

Technical effects of embodiments of the present disclosure include adjusting the flow of air through an air turbine starter using a plurality of rotating turbine vanes upstream from the turbine blades.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Various embodiments of the present disclosure are related to a bowed rotor start mitigation system in a gas turbine engine. Embodiments can include using a variable turbine vane system of an air turbine starter to control a rotor speed of a starting spool of a gas turbine engine to mitigate a bowed rotor condition using a cool-down motoring process. Under normal operation during cool-down motoring, the variable turbine vane system can be actively adjusted to deliver air pressure (i.e., compressed air) from an air supply to an air turbine starter of an engine starting system that controls starting spool rotor speed. Cool-down motoring may be performed by running an engine starting system at a lower speed with a longer duration than typically used for engine starting while dynamically adjusting the starter air valve to maintain a rotor speed and/or profile.

Figure 1:
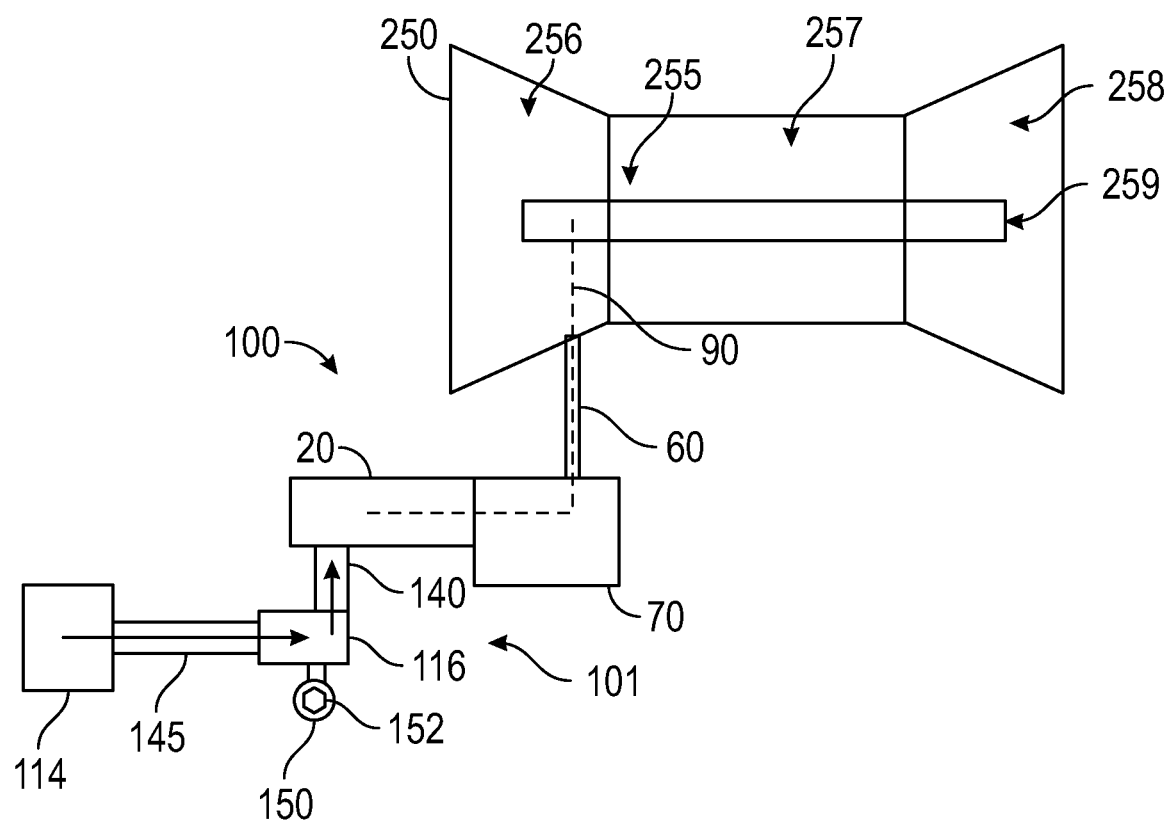
FIG. 1 is a schematic illustration of an aircraft engine starting system, according to an embodiment of the disclosure.

Referring now to the figures, FIG. 1 shows a block diagram of a gas turbine engine 250 and an associated engine starting system 100 with a valve system 101 according to an embodiment of the present disclosure. The valve system 101 includes a starter air valve 116. The valve system 101 is operable to receive a compressed air flow from a compressed air source 114 through one or more ducts 145. The compressed air source 114 can be an auxiliary power unit, a ground cart, or a cross-engine bleed.

An air turbine starter 20 of the engine starting system 100 is operably connected to the gas turbine engine 250 through an accessory gearbox 70 and drive shaft 60 (e.g., a tower shaft), as shown in FIG. 1. As depicted in the example of FIG. 1, the air turbine starter 20 is connected to the gas turbine engine 250 by a drive line 90, which runs from an output of the air turbine starter 20 to the accessory gearbox 70 through the drive shaft 60 to a rotor shaft 259 of the gas turbine engine 250. Operable connections can include gear mesh connections that in some instances can be selectively engaged or disengaged, for instance, through one or more clutches. The air turbine starter 20 is configured to initiate a startup process of the gas turbine engine 250 driving rotation of the rotor shaft 259 of a starting spool 255 of the gas turbine engine 250. The rotor shaft 259 operably connects an engine compressor 256 to an engine turbine 258. Thus, once the engine compressor 256 starts spinning, air is pulled into combustion chamber 257 and mixes with fuel for combustion. Once the air and fuel mixture combusts in the combustion chamber 257, a resulting compressed gas flow drives rotation of the engine turbine 258, which rotates the engine turbine 258 and subsequently the engine compressor 256. Once the startup process has been completed, the air turbine starter 20 can be disengaged from the gas turbine engine 250 to prevent over-speed conditions when the gas turbine engine 250 operates at its normal higher speeds. Although only a single instance of an engine compressor-turbine pair of starting spool 255 is depicted in the example of FIG. 1, it will be understood that embodiments can include any number of spools, such as high/mid/low pressure engine compressor-turbine pairs within the gas turbine engine 250.

The air turbine starter 20 is further operable to drive rotation of the rotor shaft 259 at a lower speed for a longer duration than typically used for engine starting in a motoring mode of operation (also referred to as cool-down motoring) to prevent/reduce a bowed rotor condition. If a bowed rotor condition has developed, for instance, due to a hot engine shutdown and without taking further immediate action, cool-down motoring may be performed by the air turbine starter 20 to reduce a bowed rotor condition by driving rotation of the rotor shaft 259.

A controller 380 (see FIG. 5), such as full authority digital engine control (FADEC), typically controls valve operation, for instance, modulation of the starter air valve 116 to control a motoring speed of the gas turbine engine 250 during cool-down motoring. The starter air valve 116 delivers air through a duct 140 to the air turbine starter 20. If the starter air valve 116 fails shut, a corresponding manual override 150 can be used to manually open the starter air valve 116. The manual override 150 can include a tool interface 152 to enable a ground crew to open the starter air valve 116. When starter air valve 116 fails shut and manual override 150 can be used to open the starter air valve 116.

Figure 2:
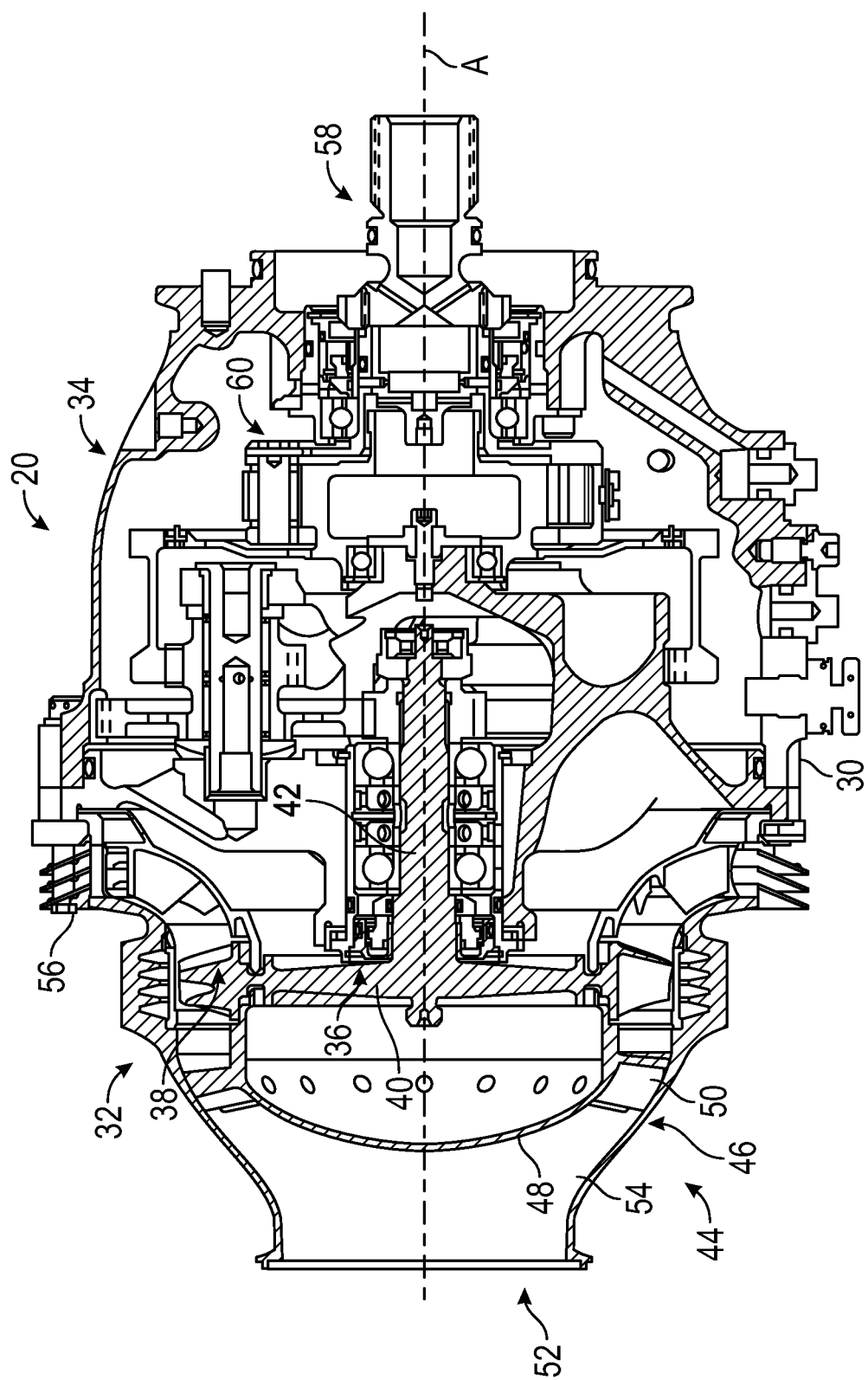
FIG. 2 is a schematic illustration an air turbine starter of the aircraft engine starting system of FIG. 1, according to an embodiment of the disclosure.
Figure 3:
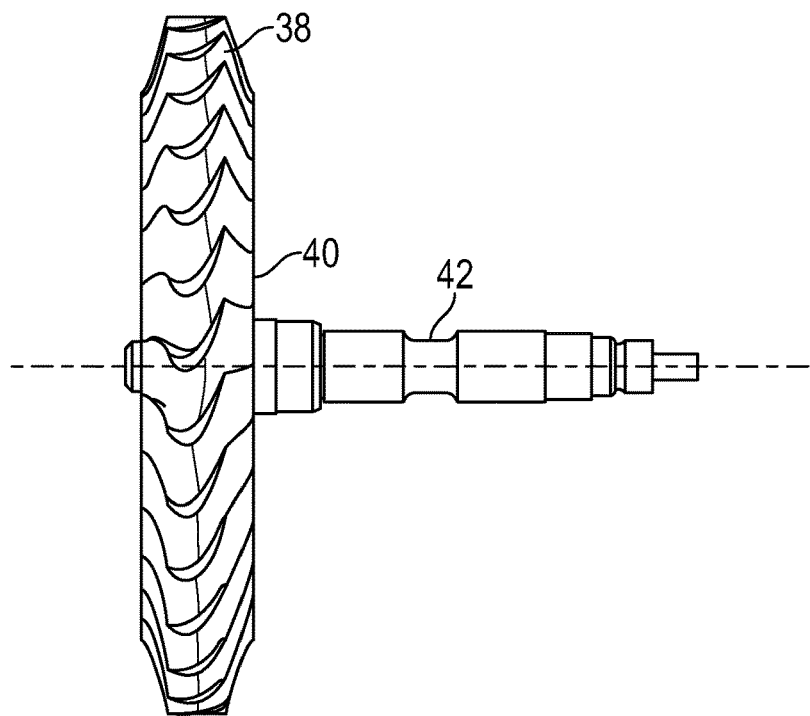
FIG. 3 is a schematic illustration a turbine wheel of the air turbine starter of FIG. 2, according to an embodiment of the disclosure.

Referring now to FIGS. 2 and 3. FIG. 2 schematically illustrates an air turbine starter 20 that is used to initiate the rotation of a gas turbine engine 250, such as a turbofan engine through an accessory gearbox 70, as described above. The air turbine starter 20 generally includes a housing assembly 30 that includes at least a turbine section 32 and an output section 34. The turbine section 32 includes a turbine wheel 36 with a plurality of turbine blades 38, a hub 40, and a turbine rotor shaft 42. The turbine blades 38 of the turbine wheel 36 are located downstream of an inlet housing assembly 44 which includes an inlet housing 46 which contains a nozzle 48. The nozzle 48 includes a plurality of turbine vanes 50 which direct compressed air flow from an inlet 52 through an inlet flowpath 54. The compressed air flows past the vanes 50 drives the turbine wheel 36 then is exhausted through an outlet 56.

The turbine wheel 36 is driven by the compressed airflow such that the turbine rotor shaft 42 may mechanically drive a starter output shaft 58 though a gear system 60, such as a planetary gear system. The air turbine starter 20 thereby transmits relatively high loads through the gear system 60 to convert the pneumatic energy from the compressed air into mechanical energy to, for example, rotate the gas turbine engine 250 for start.

The turbine blades 38 of the turbine wheel 36 and the vanes 50 of the nozzle 48—both of which are defined herein as airfoils—may be defined with computational fluid dynamics (CFD) analytical software and are optimized to meet the specific performance requirements of a specific air turbine starter. Some key engine characteristics which must be known to design an air turbine starter are the engine core inertia (the portion of the engine which is actually rotated by the air turbine starter), the engine core drag torque as a function of speed, other drag torques (such as from gearbox mounted accessories) as a function of speed, and the maximum time allowed for the start. Values of these parameters are needed for the range of ambient starting temperature conditions. From these, the air turbine starter a preferred internal gear ratio for the starter and, using the CFD tools, the optimum airfoil shape which is most efficient can be determined for each particular air turbine starter. Depending on the values of the original requirements, the airfoil shape will be different, and will be optimized to perform with highest efficiency at the design speed of the starter.

Characteristics of the airfoil shape may change from one airfoil shape to another and may include, but are not limited to, curvature, maximum thickness, axial chord length, twist, taper from root to tip, radius of the leading edge, radius of the trailing edge, straightness of the leading and trailing edge from root to tip, etc. It is possible to directly scale up or scale down the airfoil shape to meet a different set of engine starting requirements, however, if the entire flowpath geometry, to include the rotor blades 38, vanes 50 and inlet flowpath 54 is not also scaled using the same scale factor, the delivered performance of the air turbine starter may not properly scale.

Figure 4:
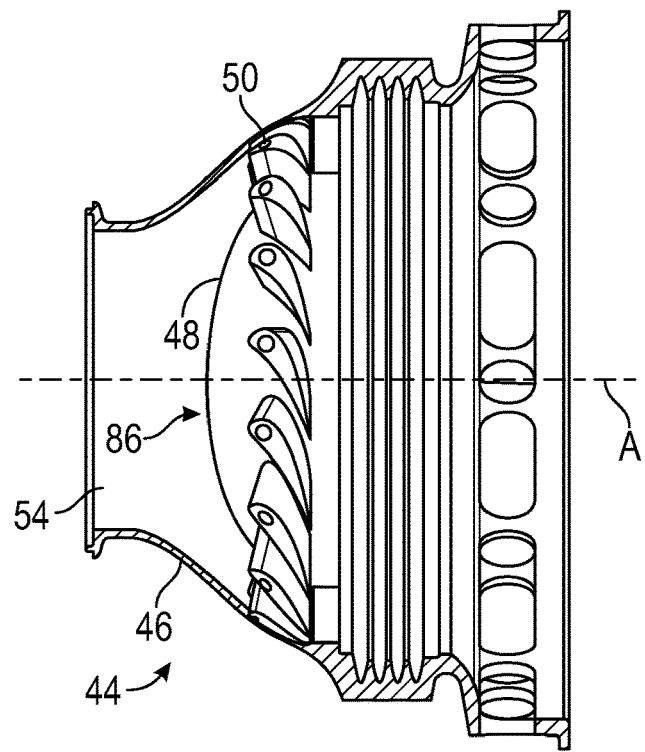
FIG. 4 is a schematic illustration of an inlet portion of the air turbine starter of FIG. 2, according to an embodiment of the disclosure.

FIG. 4 illustrates a general perspective view of the turbine inlet housing assembly 44 located upstream of the turbine wheel 36. The inlet housing assembly 44 includes the inlet housing 46 which contains the nozzle 48. That is, the inlet housing assembly 44 defines the inlet flowpath 54 into the turbine wheel 36. The turbine nozzle 48 includes a central dome shape 86 with the multiple of turbine vanes 50 which extend in a radial manner therefrom toward the inlet housing 46 and within the inlet flowpath 54. The inlet flowpath 54 is defined between the inlet housing 46 and the nozzle 48 upstream of the plurality of turbine vanes 50. If the inlet flowpath turns too sharply, the air flow may separate from the inlet housing surface, which results in recirculation and lost energy.

The shape of the inlet flowpath 54 is defined using, for example, computational fluid dynamics (CFD) analytical software and is optimized to meet the specific performance requirements of the applicable air turbine starter. This optimization results in an inlet flowpath which distributes the air flow uniformly to the annular entrance to the nozzle vanes 50. With an optimized inlet flowpath 54, the distribution of the inlet air from the cylindrical inlet duct to the annular nozzle inlet minimizes energy losses due to flow disturbances or recirculation of the air along the inlet flowpath. It should be understood that additional constraints, such as limits in axial length of the air turbine starter may alternatively or additionally be considered for optimization of the inlet flowpath. The same process can be used to create a uniquely optimized inlet flowpath to meet different starter performance requirements or the inlet flowpath shape can be scaled up or scaled down to meet different starter performance requirements. Characteristics of the inlet flowpath 54 shape can change from one air turbine starter to another and may include, but are not limited to, inlet duct diameter, radial height, axial length, radius of curvature of the defining curves, etc.

Since the air turbine starter is non-functional weight after the engine is started, it is desirable to maximize the efficiency of the air turbine starter to reduce the weight and size of the air turbine starter and increase aircraft payload. Maximum efficiency occurs when an optimized blade profile is matched with an optimized nozzle vane profile and an optimized inlet flowpath shape. Optimized torque output performance of the air turbine starter as a result of the optimized aerodynamic performance results in a reduction in air turbine starter size to facilitate a reduced starter weight since the optimized rotor will be the smallest rotor for a given gear ratio in the air turbine starter. This provides for smaller and lower weight turbine containment features as well as reduced packaging space for other external components such as tubes and ducts to thereby further reduce overall engine weight.

Figure 5:
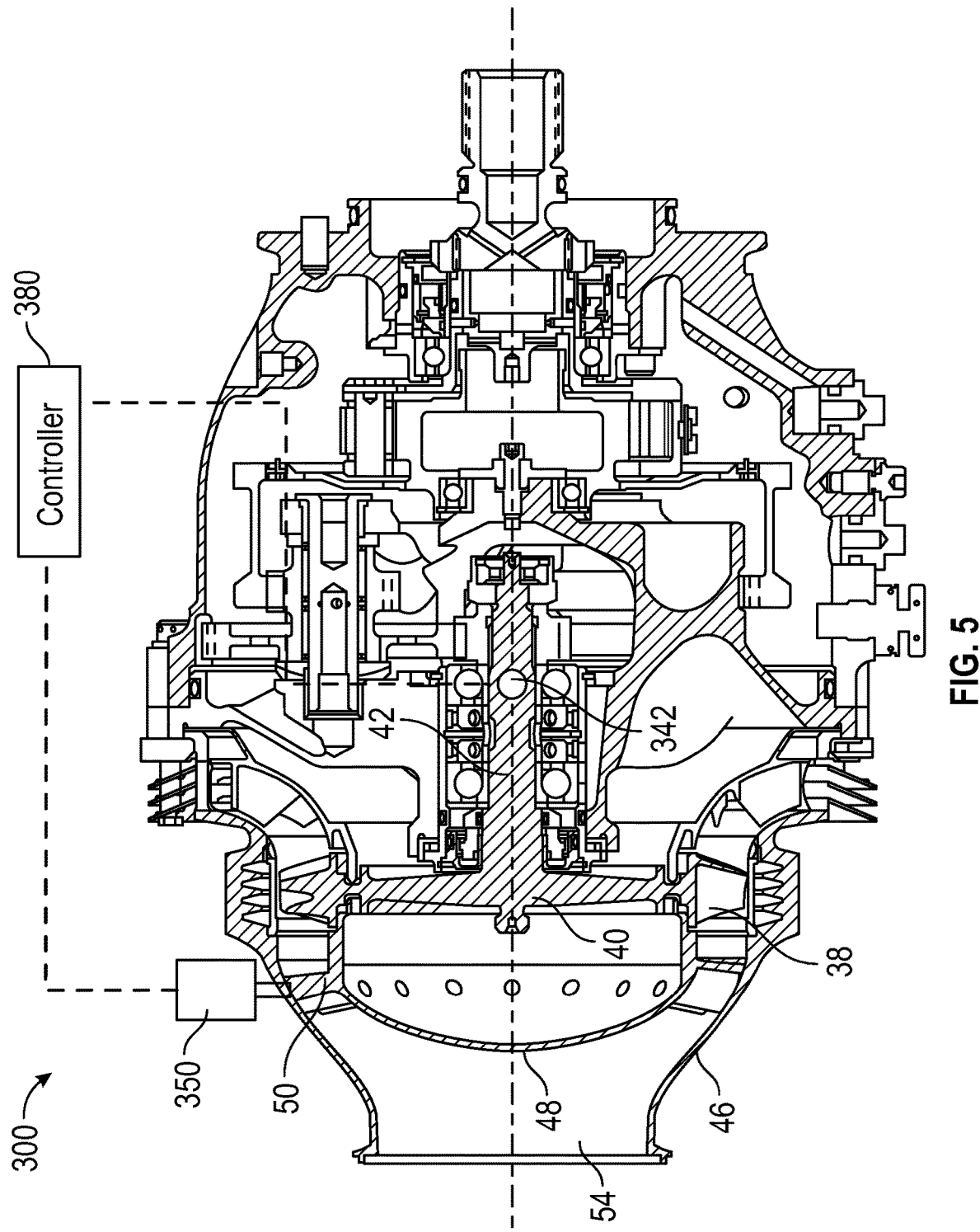
FIG. 5 is a schematic illustration of an air turbine starter having a variable turbine vane system, according to an embodiment of the disclosure.
Figure 6:
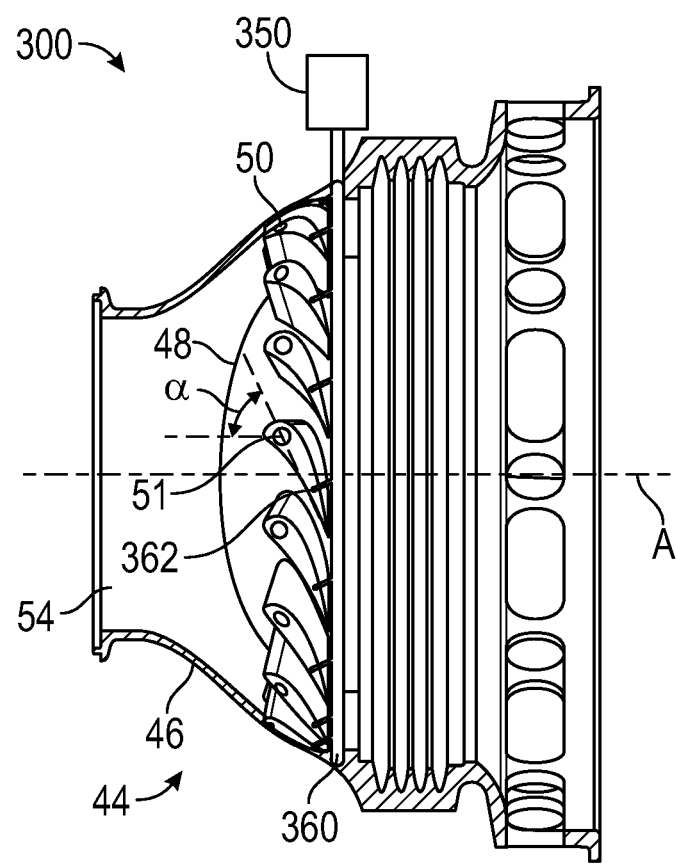
FIG. 6 is a schematic illustration of the inlet portion of an air turbine starter having a variable turbine vane system, according to an embodiment of the disclosure.

Turning now to FIGS. 5-6 while continuing to reference FIGS. 1-4, FIGS. 5 and 6 show a variable turbine vane system 300 of an air turbine starter 20, according to an embodiment of the present disclosure. Further, the efficiency and the operation of the air turbine starter 20 may be adjusted while the air turbine starter 20 is in operation utilizing the variable vane system 300. As mentioned above, the air turbine starter 20 comprises: the turbine wheel 26 including a hub 40 integrally attached to a turbine rotor shaft 42 and a plurality of turbine blades 38 extending radially outward from the hub 40. The air turbine starter 20 also comprises an inlet housing 46 at least partially surrounding the turbine wheel 36 and a nozzle 48 located upstream from the turbine wheel 36 and contained within the inlet housing 46 defining an inlet flowpath 54 between the nozzle 48 and the inlet housing 46. The inlet flowpath 54 directs air flow into the turbine blades 38. The variable turbine vane system 300 comprises a plurality of turbine vanes 50 rotatably connected to the nozzle 48. Each of the turbine vanes 50 extends radially from the nozzle 48 into the inlet flowpath 54 towards the inlet housing 46. The plurality of turbine vanes 50 are operable to adjust air flow through the inlet flowpath 54 by rotating each turbine vane 50. Each turbine vane 50 may rotate around an axis point 51 to a selected angle α, as seen in FIG. 6. The vanes 50 may rotate from a fully closed angle where the vanes 50 block the flow of air through the inlet flowpath 54 to a fully open angle where the vanes 50 allow a maximum amount of air through the inlet flowpath 54. The vanes 50 may be rotated to any selected angle α in between the fully closed angle and the fully open angle. In a non-limiting example, the selected angle α may be equal to about 0° when at the fully open angle and the selected angle α may be equal to about 90° when at the fully closed angle.

The variable turbine vane system 300 may further comprise at least one actuator 350 operably connected to at least one turbine vane 50. The actuator 350 may be at least one of a pneumatic actuator, an electric actuator, and a hydraulic actuator. The at least one actuator 350 in operation rotates at least one turbine vane 50. In an embodiment, the actuator 350 is operably connected to each turbine vane 50 through a sync-ring 360. As seen in FIG. 6, the sync-ring 360 connects to each turbine vane 50 through a plurality of control arms 362. As the actuator 350 moves the slip ring 360, each control arm 362 rotates a turbine vane 50. In an embodiment, the plurality of turbine vanes 50 are rotated in unison when the slip ring 360 is moved. The variable turbine vane system 300 may also comprise a controller 380 in communication with the actuator 350. The controller 380 is configured to operate the actuator 350 in response to airflow requirements of the air turbine starter 20. In one example, if the air turbine starter 20 requires more air flow through the air flowpath 54 then the controller 380 will command actuator 350 to move the sync-ring 360 to decrease the selected angle α of each turbine vanes 50. In a second example, if the air turbine starter 20 requires less air flow through the air flowpath 54 then the controller 380 will command actuator 350 to move the sync-ring 360 to increase the selected angle α of each turbine vanes 50. The controller 380 in operation determines the airflow requirements of the air turbine starter 20 in response to at least one of an angular velocity of a gas turbine engine 250 operably connected to the air turbine starter 20, an angular velocity of the turbine rotor shaft 42, and a pressure upstream of the air turbine starter 300.

The controller 380 may include at least one processor and at least one associated memory comprising computer-executable instructions that, when executed by the processor, cause the processor to perform various operations. The processor may be but is not limited to a single-processor or multi-processor system of any of a wide array of possible architectures, including FPGA, central processing unit (CPU), ASIC, digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The variable turbine vane system 300 may further comprise at least one speed sensor 342 to detect the angular velocity of the turbine rotor shaft 42 in operation. The speed sensor 342 is in communication with the controller 380. In an embodiment, the speed sensor 342 may be located on the turbine rotor shaft 42. The controller 342 determines the airflow requirements of the air turbine starter 20 in response to the angular velocity of the turbine rotor shaft 42. In one example, if the angular velocity of the turbine rotor shaft 42 needs to be increased, then airflow requirements may dictate that air flow must be increase through the air flowpath 54, the controller 380 will command actuator 350 to move the sync-ring 360 to decrease the selected angle α of each turbine vanes 50 and allow more air through the airflow path 54. In another example, if the angular velocity of the shaft needs to be decreased, then airflow requirements may dictate that air flow must be decreased through the air flowpath 54, the controller 380 will command actuator 350 to move the sync-ring 360 to increase the selected angle α of each turbine vanes 50 and allow less air through the airflow path 54.

Advantageously, the variable turbine vane system 300 allows optimization of the angle α of the inlet vane 50 to the angle of the turbine blade 38 to achieve higher rotational speeds of the turbine wheel 36 for lower inlet pressures and flows when compared to a fixed vane to blade configuration. A fixed vane to blade configuration will have a smaller range of maximum efficiency when compared to the variable vane system 300.

Figure 7:
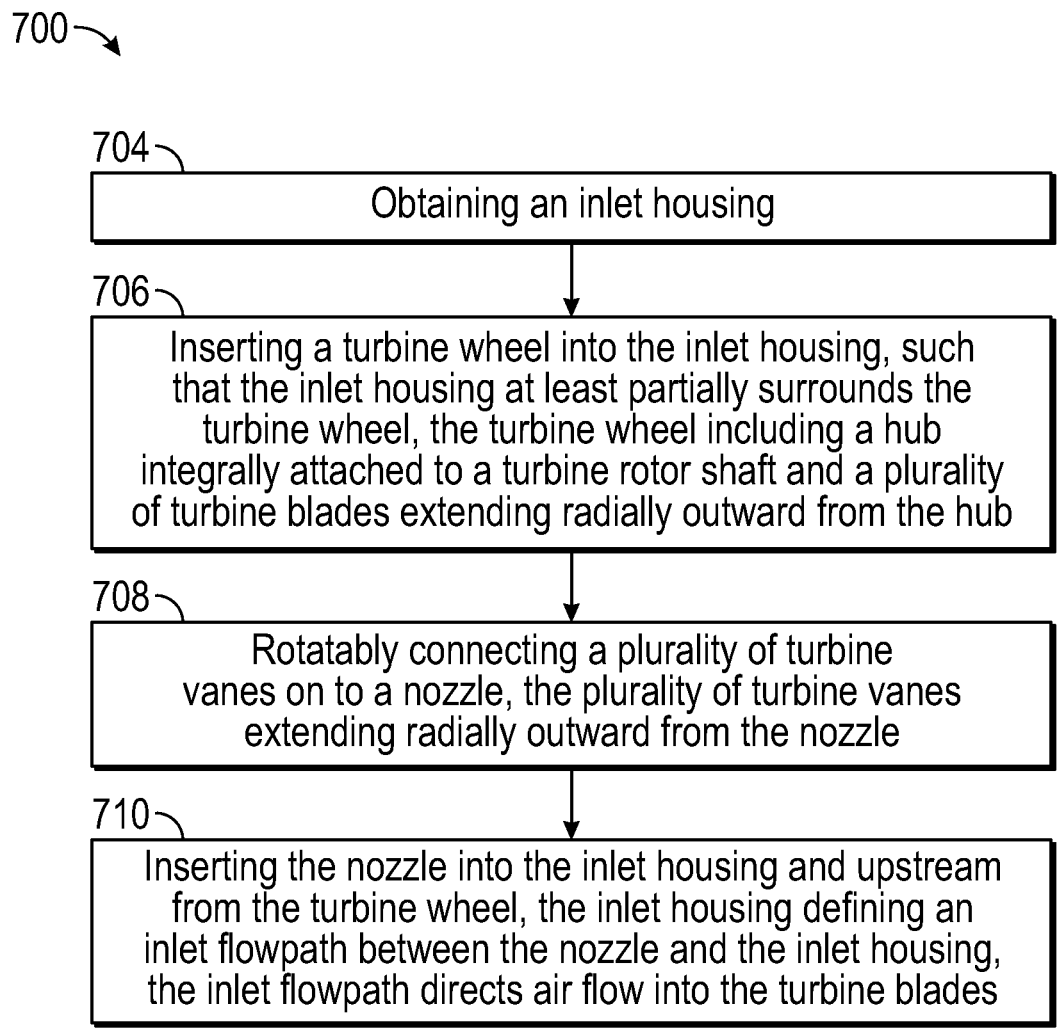
FIG. 7 is a flow diagram illustrating a method of assembling an air turbine starter, according to an embodiment of the present disclosure.

Turning now to FIG. 7 while continuing to reference FIG. 1-6, FIG. 1 shows a flow diagram illustrating a method 200 of assembling an air turbine starter 20, according to an embodiment of the present disclosure. At block 704, an inlet housing 46 is obtained. At block 706, a turbine wheel 36 is inserted into the inlet housing 46, such that the inlet housing 35 at least partially surrounds the turbine wheel 36. The turbine wheel 36 includes a hub 40 integrally attached to a turbine rotor shaft 42 and a plurality of turbine blades 38 extending radially outward from the hub 40. At block 708, a plurality of turbine vanes 50 are rotatably connected to a nozzle 48, the plurality of extending radially outward from the nozzle 48. At block 710, the nozzle 48 is inserted into the inlet housing 46 and upstream from the turbine wheel 36. The inlet housing 46 defines an inlet flowpath 54 between the nozzle 48 and the inlet housing 46. The inlet flowpath 54 directs air flow into the turbine blades 38. The plurality of turbine vanes 50 extend radially outward from the nozzle into the inlet flowpath 54 towards the inlet housing 46 and the plurality of turbine vanes 50 are operable to adjust air flow through the inlet flowpath 54 by rotating each turbine vane 50.

The method 700 may include operably connecting at least one actuator 350 to at least one turbine vane 50. As mentioned above, the at least one actuator 350 in operation rotates at least one turbine vane 50. The method 700 may also include operably connecting a sync-ring 360 to each turbine vanes 50. The sink rink 360 may be connected to each turbine vane through a control arm 362, as seen in FIG. 6. As mentioned above, the sync-ring 360 in operation rotates each turbine vane 50 when the sink rink 360 moves. The method 700 may further include operably connecting at least one actuator 350 to the sync-ring 360. The actuator 350 in operation moves the sync-ring 360. The plurality of turbine vanes 50 may be rotated in unison when the sync-ring 360 moves.

Additionally, the method 700 may include electronically connecting a controller 380 to the actuator 350. As mentioned above, the controller 380 operates the actuator 350 in response to airflow requirements of the air turbine starter 20. The method 700 may also include, electronically connecting a speed sensor 342 to the controller 380. The speed sensor 342 in operation detects the angular velocity of the turbine rotor shaft 42. As mentioned above, the controller 380 in operation determines the airflow requirements of the air turbine starter 20 in response to the angular velocity of the turbine rotor shaft 42. As seen in FIG. 5, the speed sensor 342 may be located on the turbine rotor shaft 42.

While the above description has described the flow process of FIG. 7 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air turbine starter comprising:
   a turbine wheel including a hub integrally attached to a turbine rotor shaft and a plurality of turbine blades extending radially outward from the hub;
   an inlet housing at least partially surrounding the turbine wheel;
   a nozzle located upstream from the turbine wheel and contained within the inlet housing defining an inlet flowpath between the nozzle and the inlet housing, the inlet flowpath directs air flow into the turbine blades;
   a plurality of turbine vanes rotatably connected to the nozzle, each turbine vane extending radially from the nozzle into the inlet flowpath towards the inlet housing, wherein the plurality of turbine vanes are operable to adjust air flow through the inlet flowpath by rotating each turbine vane, and
      wherein each of the plurality of turbine vanes can be rotated to any selected angle in between a fully closed angle and a fully open angle, the selected angle is equal to zero degrees when at the fully open angle and the selected angle is equal to 90 degrees when at the fully closed angle,
   a sync-ring operably connected to each turbine vane, wherein the sync-ring in operation rotates each turbine vane when the sync-ring moves,
   an actuator operably connected to the sync-ring, wherein the actuator in operation moves the sync-ring;
   a controller in communication with the actuator, wherein the controller is configured to operate the actuator in response to turbine blade airflow requirements of the air turbine starter, and
   a speed sensor in communication with the controller, wherein the speed sensor in operation detects an angular velocity of the turbine rotor shaft,
   wherein the controller is configured to determine the turbine blade airflow requirements of the air turbine starter to mitigate a bowed rotor condition of a gas turbine engine operably connected to the air turbine starter in response to an angular velocity of the gas turbine engine, an angular velocity of the turbine rotor shaft, and a pressure upstream of the air turbine starter, and
   wherein the controller is further configured to operate the actuator in response to the determined turbine blade airflow requirements of the air turbine starter to mitigate the bowed rotor condition.

2. The air turbine starter of claim 1, wherein:
   the actuator is at least one of a pneumatic actuator, an electric actuator, or a hydraulic actuator.

3. The air turbine starter of claim 1, wherein:
the speed sensor is located on the turbine rotor shaft.

4. A method of assembling an air turbine starter comprising:
- obtaining an inlet housing;
- inserting a turbine wheel into the inlet housing, such that the inlet housing at least partially surrounds the turbine wheel, the turbine wheel including a hub integrally attached to a turbine rotor shaft and a plurality of turbine blades extending radially outward from the hub;
- rotatably connecting a plurality of turbine vanes on to a nozzle, the plurality of turbine vanes extending radially outward from the nozzle;
- inserting the nozzle into the inlet housing and upstream from the turbine wheel, the inlet housing defining an inlet flowpath between the nozzle and the inlet housing, the inlet flowpath configured to direct air flow into the plurality of turbine blades;
- operably connecting a sync-ring to each of the plurality of turbine vanes, wherein the sync-ring in operation rotates each of the plurality of turbine vanes when the sync-ring moves, and
- operably connecting an actuator to the sync-ring, wherein the actuator in operation moves the sync-ring,
- electronically connecting a controller to the actuator, and
- electronically connecting a speed sensor to the controller, wherein the speed sensor in operation detects the angular velocity of the turbine rotor shaft,
- wherein the plurality of turbine vanes extend radially outward from the nozzle into the inlet flowpath towards the inlet housing and the plurality of turbine vanes are rotatable to adjust air flow through the inlet flowpath,
- wherein each of the plurality of turbine vanes can be rotated to any selected angle in between a fully closed angle and a fully open angle, the fully open angle being equal to zero degrees and the fully closed angle being equal to 90 degrees, and
- wherein the controller is configured to determine turbine blade airflow requirements of the air turbine starter to mitigate a bowed rotor condition of a gas turbine engine operably connected to the air turbine starter in response to an angular velocity of the gas turbine engine, an angular velocity of the turbine rotor shaft, and a pressure upstream of the air turbine starter, and
- wherein the controller is further configured to operate the actuator in response to the determined turbine blade airflow requirements of the air turbine starter to mitigate the bowed rotor condition.

5. The method of claim 4, wherein:
the actuator is at least one of a pneumatic actuator, an electric actuator or a hydraulic actuator.

6. The method of claim 4, wherein:
the speed sensor is located on the turbine rotor shaft.

* * * * *